United States Patent [19]

Barker, III et al.

[11] Patent Number: 4,669,025

[45] Date of Patent: May 26, 1987

[54] SEMICONDUCTOR JUNCTION TEMPERATURE EMULATOR

[75] Inventors: Charles R. Barker, III, Harvard; Robert V. White, Hudson; John T. Bartoszek, Bolton, all of Mass.

[73] Assignee: Digital Equipment Corporation, Maynard, Mass.

[21] Appl. No.: 854,137

[22] Filed: Apr. 21, 1986

[51] Int. Cl.⁴ .............................................. H02H 6/00
[52] U.S. Cl. .................................... 361/103; 307/117; 307/310; 318/334; 318/473; 340/588
[58] Field of Search ......................... 361/93, 103, 106; 340/584, 588, 595, 599; 330/207 P, 298; 318/334, 333, 471, 472, 473; 307/117, 310; 323/907

[56] References Cited

U.S. PATENT DOCUMENTS

| | | | |
|---|---|---|---|
| 3,885,200 | 5/1975 | Burkle | 361/103 |
| 3,932,849 | 1/1976 | Welch | 340/599 X |
| 4,001,649 | 1/1977 | Young | 361/103 X |
| 4,157,513 | 6/1979 | Ghiringhelli et al. | 330/298 |
| 4,329,725 | 5/1982 | Hart | 330/207 P X |
| 4,381,480 | 4/1983 | Hara et al. | 318/473 X |

Primary Examiner—A. D. Pellinen
Assistant Examiner—Derek S. Jennings
Attorney, Agent, or Firm—William E. Cleaver

[57] ABSTRACT

The present device includes a resistor network wherein the values of the resistors are chosen such that the heat generated by current passing through the resistors will be substantially equal to heat generated at a semiconductor junction which is to be cooled. The present device further includes a heat sink which is substantially identical to the heat sink employed to withdraw heat from the semiconductor junction to be cooled. Accordingly, the present device provides heat which is identical to the heat generated at the semiconductor junction and which heat remains ambient to the semiconductor junction to be cooled. The present device further includes a sensor which converts temperature to an electrical signal and which is located substantially in the center of the resistor network and at a distance from the heat sink that approximates the position of the semiconductor junction from its heat sink. The temperature to electrical signal sensor generates a control electrical signal whose value is commensurate with the temperature of the air at the location of the temperature to electrical signal sensor and that temperature is substantially identical to the temperature at the semiconductor junction. The control electrical signal is employed by a servo circuit to drive an air fan to move air over the semiconductor junction to cool it. However, the air passed over the junction is limited to the quantity necessary to prevent damage as compared to a maximum airflow. Hence, there is a reduction in acoustical noise and a saving in energy.

10 Claims, 4 Drawing Figures

SEMICONDUCTOR JUNCTION TEMPERATURE EMULATOR

BACKGROUND OF THE INVENTION

In semiconductor devices (such as a VLSI) there is at least one junction and usually more than one junction, i.e. the interface between different semiconductor materials. The junction is the weakest section of the semiconductor device from the standpoint of being vulnerable to damage by heat. In the prior art, the computer industry has provided large fans, or at least fans which can effect large air mass flow over semiconductor circuits to keep them cool. The computer industry has determined empirically the temperature at which particular semiconductor junctions are damaged and what the air mass flow must be to prevent such damage. Accordingly the air mass movers, (i.e. the fans), move the air at the maximum air flow necessary to prevent damage, even though the heat being generated by the semiconductor generates a temperature which is far lower than the temperature for which maximum air flow is required. Such a prior art arrangement is wasteful, in so far as power (energy) is concerned, since the system could be run at a lower air mass flow rate if indeed the temperature generated by the semiconductor did not warrant the maximum air flow. In addition in the prior art, the fans effecting the air mass flow produce high acoustical noise and this infirmity is particularly troublesome since computers are being moved from the "computer room" to offices where personnel are trying to do all kinds of work and where acoustical noise is undesirable. The present device enables a fan to be driven only to the extent necessary which results in a savings in energy and which results in a reduction in acoustical noise.

SUMMARY OF THE INVENTION

In a preferred embodiment of the present emulator, there are four electrical resistors coupled in parallel between two electrical terminals to which electrical power is supplied to pass current therethrough. A plurality of power dissipation values for the semiconductor junction (or junctions), which needs cooling, are empirically determined from which the temperature profile can be predicted and measured. In addition, the temperature at which the semiconductor junction is damaged, is also determined empirically. The resistor values of the emulator are chosen so that for a given power dissipation in the semiconductor device the temperature of the emulator is substantially equal to the temperature of the semiconductor junction (or junctions). In addition, since the semiconductor junction is located close to a heat sink (to conduct the internally generated heat away from the semiconductor junction), the emulator is also equipped with a heat sink which has substantially the same thermal characteristics as that provided for the semiconductor junction. Accordingly the reduction of the temperature of the emulator, by the heat sink, matches the reduction of the temperature, by the heat sink, of the semiconductor device being monitored. Mounted in close proximity to the heat sink of the emulator and among the resistors is a temperature sensor, which in a preferred embodiment is a temperature to electrical signal converter. As the temperature of the air ambient to the sensor rises, the control electrical signal, generated by the temperature to electrical converter, increases. Accordingly, the drive to the fan which moves the air mass increases through the action of a servo circuit to move additional air over the semiconductor junction and effect greater cooling and therefore reduce the likelihood of damage to the semiconductor junction.

The objects and features of the present invention will be better understood in view of the following description taken in conjunction with the drawings wherein.

Figure 1:
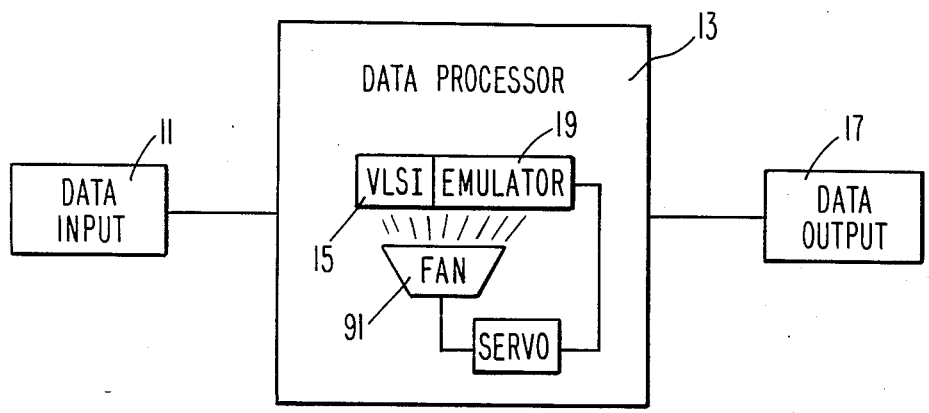
FIG. 1 is a block diagram schematic of the data processing system with which the present device is used.

Consider FIG. 1. In FIG. 1 there is shown a data input device 11.

The data input device 11 can be any well known computer terminal such as a Digital Equipment Corporation VT220. Data input device 11 is not part of the present invention but is shown to give better understanding of the operation of the present invention. Data input device 11 transmits data and instruction signals to the central processing unit or data processor 13. The data processor 13 can be, by way of example, a Digital Equipment Corporation (DEC) VAX 8200. The data processor 13 is not part of the present invention but is included in the description to provide a better understanding of the present invention.

Included in the circuitry of the data processor 13 is at least one very large semiconductor integrated (VLSI) circuit 15. As its name implies a VLSI has a semiconductor member. The temperature of the semiconductor member rises in accordance with the heat dissipation therein. The generation of such heat in computer circuits was present from the early "hard tube" or "vacuum tube" days of the computers such as ENIAC, ILLIAC, SEAC, MANIAC and the like. Those early systems had to include fans driving air over the tube circuits. In the present state-of-the-art, the generation of such heat continues to be considered a problem because it can and does cause damage to the semiconductor junction (or junctions), of a semiconductor member. As can be further gleaned from FIG. 1, the data signals are processed in the data processor 13 and transmitted to the data output terminal 17. The data output terminal can be a DEC VT 220.

Figure 4:
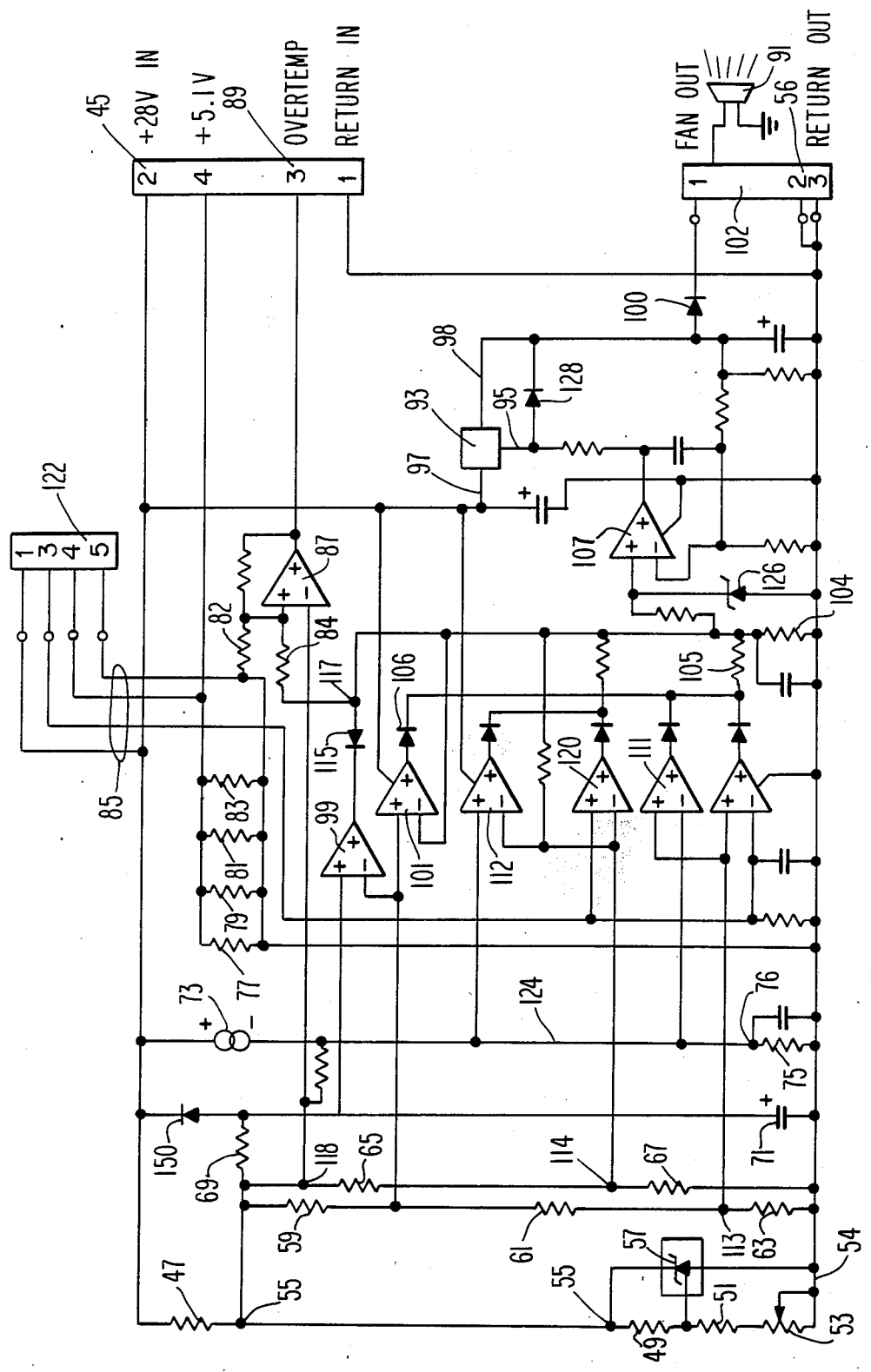
FIG. 4 is a schematic diagram of a servo circuit employed with the present system.

If we considered now the main thrust of the present invention, we find in FIG. 1 that we have an emulator 19. The emulator 19, in a preferred embodiment is made up of four resistors 21, 23, 25 and 27 (shown in FIG. 2). The resistors 23 and 25 are connected in a first series connection, while the resistors 21 and 27 are connected in a second series connection. As can be further seen in FIG. 2, the first series connection is connected in parallel with the second series connection. It should be understood that all four of the resistors 21, 23, 25 and 27 could be connected in parallel (as depicted in FIG. 4) or there could be more than four resistors, or less than four resistors, or the resistors could be connected in some other series-parallel arrangement. The general requirement is that the temperature rise versus power dissipation characteristic of the emulator be substantially identical to the same characteristic of the semiconductor member. Thus from the knowledge of the temperature of the emulator, the temperature of the semiconductor members is directly inferred. The arrangement, connection, and values of the emulator resistors to meet this constraint are determined empirically.

It must be remembered that the VLSI has a heat sink as part of its package. The heat sink absorbs and carries away a certain amount of heat generated in response to the electrical current flowing in the circuit. The emulator also includes a heat sink which has substantially the same thermal characteristics as the heat sink used with the VLSI. In a preferred embodiment the resistors 21, 23, 25 and 27 are mounted on the heat sink plate 29. The heat sink 29 can be any good heat conductor such as copper, or aluminum or beryllium oxide or the like. In a preferred embodiment the heat sink 29 is an aluminum material. It should be understood that if the heat sink is an electrical conductor, then it must be electrically isolated from the resistors 21, 23, 25 and 27.

Figure 2:
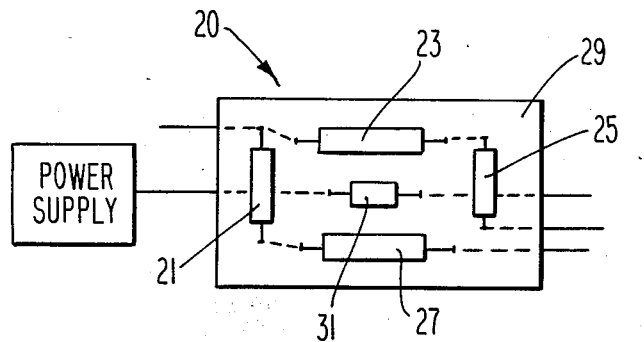
FIG. 2 is a block diagram layout of the emulator board.

In addition the emulator 20, shown in FIG. 2, has a temperature to electrical current converter 31, mounted within the resistor network and in close proximity to the heat sink 29. In a preferred embodiment the temperature to electrical current converter (i.e. the sensor) is an AD 592 manufactured by Analog Devices Inc. In a preferred embodiment the temperature to electrical current converter generates control electrical current whose value is commensurate with the temperature value sensed by the converter. In other words, the higher the temperature, the higher the control electrical current generated. The control electrical current is transmitted to a servo loop circuit. The servo loop circuit employed with the preferred embodiment is shown in FIG. 4. The servo loop circuit operates, in response to the control electrical current to drive the fan or fans as the temperature increases and reduce the drive as the temperature goes lower.

Consider FIG. 4 which is a schematic diagram of the servo circuitry employed with the present system. The purpose of the servo circuit of FIG. 4 is to respond to the electrical current from the sensor 73 to drive the fan 91, and/or provide an alarm signal at terminal 89 and provide a fail safe circuit through operational amplifier 111.

In FIG. 4 there is shown a +28 volt input terminal 45. It should be understood that other values of input voltages can be employed depending upon the operating voltage of the fan, or fans, to be driven. The +28 volt input is applied across the resistors 47, 49, 51 and the potentiometer 53. The voltage value at point 55 can be adjusted by the potentiometer 53. As can be seen in FIG. 4 the line 54 is connected to the "return" terminal 56. Line 54 can be considered to be at ground potential but that need not be the case as long as line 54 provides a potential which is sufficiently negative with respect to the +28 volt input to cause the circuit of FIG. 4 to operate.

It should be noted that the voltage at point 55 is applied across the precision voltage reference device 57. The precision voltage device is part no. TL 431 manufactured by Texas Instruments Corp. Accordingly the voltage value at point 55 is a precision reference voltage value for the servo circuit of FIG. 4. The voltage at point 55 is also applied across the resistors 59, 61 and 63 as well as across the resistors 65 and 67. Note also that there is an R-C circuit comprising the resistor 69 and the capacitor 71. In FIG. 4 there is shown a temperature sensor 73. While in a preferred embodiment the sensor 73 is a temperature to electrical current converter, it should be understood that other types of temperature sensors could be used. Note that the sensor 73 is serially connected to resistor 75 and that the series connection is between +28 volts and ground. Hence when the system is operating the sensor 73 provides electrical current to pass across the resistor 75 and the higher the temperature sensed by sensor 73, the higher will be the voltage value at point 76.

The four resistors 77, 79, 81 and 83 are the four emulator resistors and are shown connected in parallel. The resistors 77, 79, 81 and 83 are analogous to the resistors 21, 23, 25 and 27 shown in FIG. 2. However, as discussed earlier the resistors of the emulator can be arranged in different series—parallel arrangements. The four lines 85 go to another servo circuit which is similar to the servo circuit of FIG. 4.

Connected to the emulator resistors 77, 79, 81 and 83 is an operational amplifier 87. The operational amplifier 87 is employed to alert the system that the semiconductor device is being subjected to an "overtemperature" condition. As mentioned earlier, when the sensor 73 experiences higher temperatures, higher voltages are developed at point 76. When the voltage at point 76 exceeds the voltage at point 118, current will be fed to the operational amplifier 87 to cause that amplifier to reduce its output signal below a threshold which will cause an alarm signal through the overtemperature terminal 89.

As was mentioned above the main purpose of the servo circuit shown in FIG. 4 is to drive the fan 91 at a speed which will keep the semiconductor junction from burning out but nonetheless will not drive the fan unnecessarily if the temperature of the semiconductor junction does not warrant it. The fan 91 is driven, current-wise, by the linear voltage regulator 93. The linear voltage regulator 93 is driven by signals to the gate terminal 95. Note that the current input terminal 97 is connected to the +28 V line and the output terminal 98 is connected through the diode 100 to the fan terminal block 102.

Fan operation is inhibited after the application of the +28 V for a period of time. In the preferred embodiment this delay is 15 to 20 seconds. This delay at "turn on" is effected as follows: When the system is turned on, that is, the +28 V is applied to the circuit of FIG. 4, capacitor 71 is discharged and thus has essentially zero voltage. Notice that the voltage on capacitor 71 is applied to the positive terminal of operational amplifier 99. The negative terminal of operational amplifier 99 has a voltage proportional to the voltage at node 55, the proportion being that of the voltage divider of the series combination of resistors 61 and 63 with the series combination of resistors 59, 61 and 63. This is a positive value greater than zero and thus the output of operational amplifier 99 is driven into conduction. Thus any currents directed into node 117 will pass through diode 115 and the output of operational amplifier 99 to ground. Thus the voltage at node 117 is the series combination of the voltage at the output of operational amplifier 99 and the forward conduction voltage of diode 115 which is typically 1-2 volts. This voltage is applied to operational amplifier 107 through resistor R328 and is not sufficient to cause operational amplifier 107 to apply a signal of sufficient amplitude to cause linear regulator 93 to conduct current.

Capacitor 71 begins charging through resistor 69 so that after a time determined by the time constant of resistor 69 and capacitor 71, the voltage at the negative terminal of operational amplifier 99, and the voltage at node 55 increases. The voltage at the positive terminal becomes greater than the voltage at the negative terminal and the output of operational amplifier 99 is driven to source current. Diode 115 prohibits the flow of current from the output of operational amplifier 99 and thus effectively disconnects it from node 117, allowing operation to proceed.

When the system is turned off, capacitor 71 will discharge through diode 150 so that the voltage on capacitor 71 is never more than the voltage on the +28 V supply plus the forward conduction voltage of diode 150. As the voltage across 150 during conduction is typically less than 1 volt, it is assured that the voltage on capacitor 71 will always be approximately zero after the system is turned off.

After the output of operational amplifier 99 is disconnected from node 117 by the reverse biased diode 115, the output of operational amplifier 101 provides current through diode 106, through resistor 103, through resistor 105 to operational amplifier 107. The current from the operational amplifier 101 to the operational amplifier 107 provides minimum "turn on" control current to the gate element 95. The minimum "turn on" current causes the linear voltage regulator 93 to provide the minimum drive current for the fan 91. As mentioned above, as the sensor 73 gets heated, more current is generated by sensor 73 and the voltage at point 76 goes higher. Accordingly, a higher voltage is applied to the positive input terminal of operational amplifier 112. The input signal to the negative terminal of operational amplifier 112 is from point 114. The voltage which is arranged for point 114 (through the voltage divider made up of resistors 65 and 67) is of such a value that the sensor must produce a sufficient current (representing some threshold temperature at the semiconductor junction) to cause the operational amplifier 112 to be turned on. In other words the fan 91 will be driven at some minimum speed by the signal from operational amplifier 101 and when the temperature value of the emulator (therefore the temperature value at the servo conductor junction) exceeds a selected threshold, the fan 91 will be driven harder by the signal from operational amplifier 112. The current from operational amplifier 112 passes through resistor 110, to drive operational amplifier 107. As mentioned above, the current from operational amplifier 107 is transmitted to the gate terminal 95 to drive the linear voltage regulator 93 and thus drive the fan 91. The higher the temperature goes the more the fan 91 will be driven and hence the more cooling air will be passed over the servo conductor junction to cool it. The operational amplifier 120 serves the same function as operational amplifier 112 but is employed with the circuitry connected to terminal plate 122.

Operational amplifier 111 serves as part of a fail safe circuit. Note that the sensor output line 124 is connected to the negative input terminal of operational amplifier 111. Accordingly operational amplifier 111 is turned off once the system commences to operate. However, if the sensor should burn out, or become inoperative for any reason, the negative input terminal would be "open" and the positive signal from point 113 would turn on the operational amplifier 111 which in turn acts to drive operational amplifier 107. As discussed earlier when the operational amplifier 107 is turned on, it drives the linear voltage regulator 93 which drives the fan 91.

As can be seen in FIG. 4, there is a zener diode 126 connected to the operational amplifier 107. The zener diode 126 clamps the input signal to the positive terminal of operational diode 107. Accordingly the operational amplifier 107 cannot be driven to a point where its output will drive the fan (through the linear voltage regulator 93) to a damage point. In other words temperature conditions at the emulator (hence at the VLSI semiconductor junction) may cause the input signals to drive operational amplifier 107 and regulator 93 to a point where the fan 91 would be burned out or damaged. The clamp 126 prevents such an undesirable operation.

It should also be understood that the linear voltage regulator 93 cannot have the value of the voltage at the gate 95 exceed the value of the voltage at the output terminal 98. In the event such voltage conditions happen, the diode 128 "short circuits" current across the gate and output terminals to prevent the undesirable condition. The diode 100 prevents back surges of current which result from an inductance discharge when the fan 91 turns off.

Figure 3:
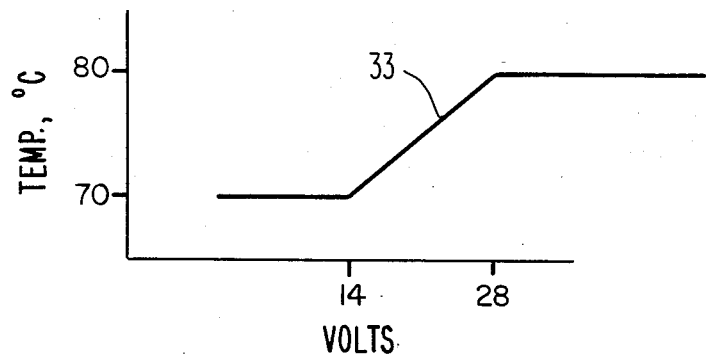
FIG. 3 is a graphic depiction of a temperature - voltage relationship for the servo loop.

In FIG. 3 there is shown a temperature - volts graph, which shows the operating characteristic between 80° C. and 90° C. ambient on the VLSI. As can be understood from the description above and in a preferred embodiment, the servo loop circuit is designed to not change the speed of the fan as long as the temperature of the junction of the VLSI is at or below 80° C. (as determined by the emulator). When the temperature of the sensor exceeds 80° C., the servo loop operates on the slope 33 of the curve shown in FIG. 3. In a preferred embodiment, the servo loop applies between 14 and 28 volts to the fan or fans and, of course, other limits of voltage could be used depending upon the design of the fan. In a preferred embodiment, the speed of the fan at 28 volts is sufficient to move the maximum amount of air required to prevent damage to the VLSI under the "worst case" situation. On the other hand it should be noted that anywhere along the slope 33, the demand (by the operation of the data processor 13) for current through the VLSI may be reduced and the fan (in response to the servo circuit) will slow down thereby reducing the acoustical noise and economizing on the power required to drive the fan.

We claim:

1. A device for selectively controlling the cooling of a semiconductor junction of a semiconductor device in order to prevent damage thereto by heat, wherein said semiconductor device includes a heat sink means located to withdraw heat from said semiconductor junction and it surroundings at a particular rate and wherein said device has a generated temperature profile, comprising in combination: current conducting circuitry means having an electrical resistance characteristic such that in response to a plurality of different applied electrical current values a generated temperature profile is effected which substantially matches said generated temperature profile of said semiconductor junction; heat sink means disposed in close proximity to said current conducting circuitry means to withdraw heat from said current circuitry means and its surroundings, said last mentioned heat sink means formed to withdraw heat at substantially the same rate as said particular rate; temperature sensor means formed to generate control electrical signals whose value is commensurate with the temperature sensed by said temperature sensor means, said temperature sensor means disposed in close proximity to said current conducting circuitry means so as to be responsive to the value of the generated temperature at said current conducting circuitry means; servo circuitry means connected to said temperature sensor means to receive said control electrical signals and in response provide selected drive currents for a cooling means; and cooling means disposed in close proximity to said semiconductor junction and connected to said servo circuitry means to receive said selected drive current therefrom to enable said cooling means to effect different amounts of cooling with respect to said semiconductor junction.

2. A device for selectively controlling the cooling of a semiconductor junction of a semiconductor device according to claim 1 wherein said current conducting circuitry means comprises a plurality of interconnected resistors.

3. A device for selectively controlling the cooling of a semiconductor junction of a semiconductor device according to claim 1 wherein said temperature sensor is a temperature to current converter.

4. A device for selectively controlling the cooling of a semiconductor junction of a semiconductor device according to claim 1 wherein said cooling means is an air moving fan means.

5. A device for selectively controlling the cooling of a semiconductor junction of a semiconductor device according to claim 1 wherein said servo circuitry means includes signal selecting means which delays the operation of said cooling means until said temperature sensor commences producing control signals.

6. A device for selectively controlling the cooling of a semiconductor junction of a semiconductor device according to claim 5 wherein said servo circuitry means includes minimum drive signal means which functions to cause said servo circuitry means to provide a minimum drive signal to said cooling means which in turn effects a minimum cooling of said semiconducting junction.

7. A device for selectively controlling the cooling of a semiconductor junction of a semiconductor device according to claim 6 wherein said servo circuitry means further includes a variable drive signal means which functions to cause said servo circuitry means to provide varying drive current which is commensurate with the temperature experienced by said temperature sensor whereby the higher the temperature experienced by said temperature sensor the greater is the cooling effect on said semiconductor junction.

8. A device for selectively controlling the cooling of a semiconductor junction of a semiconductor device according to claim 1 wherein said servo circuitry means includes fail safe means which functions to drive said cooling means to provide a maximum cooling of said semiconductor junction in the event said temperature sensor becomes inoperative.

9. A device for selectively controlling the cooling of a semiconductor junction of a semiconductor device according to claim 1 wherein said cooling means experiences damage in the event drive current which has a value that exceeds a maximum drive current value is applied to said cooling means and wherein said servo circuitry means includes clamp means which function to limit drive current to said cooling means so that said drive current does not exceed said maximum drive current.

10. A device for selectively controlling the cooling of a semiconductor junction of a semiconductor device according to claim 1 wherein said servo circuitry means include an alarm circuitry means which generates an alarm signal in the event the temperature generated by said current conducting circuitry means exceeds a certain value.

* * * * *